United States Patent
Li et al.

(10) Patent No.: US 9,198,206 B2
(45) Date of Patent: Nov. 24, 2015

(54) AUTOMATIC CONNECTION METHOD AND APPARATUS BETWEEN AN AUTOMOBILE DIAGNOSTIC DEVICE AND A VCI DEVICE

(71) Applicant: Autel Intelligent Technology Co., Ltd., Shenzhen (CN)

(72) Inventors: Hongjing Li, Shenzhen (CN); Xiangxi Pan, Shenzhen (CN); Shijun Yu, Shenzhen (CN)

(*) Notice: Subject to any disclaimer, the term of this patent is extended or adjusted under 35 U.S.C. 154(b) by 60 days.

(21) Appl. No.: 14/141,210

(22) Filed: Dec. 26, 2013

(65) Prior Publication Data

US 2015/0133053 A1    May 14, 2015

(51) Int. Cl.
*H04W 24/00* (2009.01)
*G06F 7/00* (2006.01)
*H04W 76/02* (2009.01)

(52) U.S. Cl.
CPC .......... *H04W 76/02* (2013.01); *H04W 76/028* (2013.01)

(58) Field of Classification Search
CPC ...... G07C 5/008; G07C 5/0808; G07C 5/085; H04W 76/00; H04W 76/02
USPC ............. 455/41.1–41.3, 67.11, 423–425; 701/31.5, 33.2, 33.4, 33.5, 32.7–32.8
See application file for complete search history.

(56) References Cited

U.S. PATENT DOCUMENTS

| | | | |
|---|---|---|---|
| 5,491,418 A * | 2/1996 | Alfaro et al. | 324/402 |
| 2007/0083304 A1* | 4/2007 | Yamada | 701/29 |
| 2008/0167773 A1* | 7/2008 | Gumpinger et al. | 701/33 |
| 2009/0216493 A1* | 8/2009 | Underdal et al. | 702/183 |
| 2011/0276219 A1* | 11/2011 | Swaminathan et al. | 701/32 |
| 2012/0309315 A1* | 12/2012 | Sakata et al. | 455/41.2 |
| 2013/0197742 A1* | 8/2013 | Underdal et al. | 701/33.4 |
| 2014/0012947 A1* | 1/2014 | Schaller | 709/217 |
| 2014/0180531 A1* | 6/2014 | Lipscomb et al. | 701/33.2 |
| 2014/0180532 A1* | 6/2014 | Ubik et al. | 701/33.2 |
| 2014/0200760 A1* | 7/2014 | Kaufmann et al. | 701/29.3 |
| 2014/0236416 A1* | 8/2014 | Amirpour et al. | 701/29.6 |

* cited by examiner

*Primary Examiner* — Simon Nguyen
(74) *Attorney, Agent, or Firm* — Dahyee Law Group; Leon E. Jew

(57) ABSTRACT

The present invention provides an apparatus for automatic connection between an automobile diagnostic device and a VCI device and a method for the automatic connection. The method includes the steps of: periodically connecting the VCI device with at least one of a plurality of connection modes in pre-stored connection records when the automobile diagnostic device is started; and, when successfully connecting the VCI device with a successful connection mode, communicating with the VCI device with the successful connection mode. The method and apparatus according to this invention significantly improve the operation efficiency and user experience of the automobile diagnostic device.

10 Claims, 2 Drawing Sheets

---

Periodically connecting a VCI device in at least one of a plurality of connection modes in stored connection records when the automobile diagnostic device is started — S1

When successfully connecting the VCI device in a successful connection mode, communicating with the VCI device in the successful connection mode — S2

AUTOMATIC CONNECTION METHOD AND APPARATUS BETWEEN AN AUTOMOBILE DIAGNOSTIC DEVICE AND A VCI DEVICE

CROSS REFERENCE TO RELATED APPLICATION

This application is based on, and claims the benefit of priority to, the Chinese patent application Ser. No. 201310557206.X, entitled "Automatic Connection Method and Apparatus between an Automobile Diagnostic Device and a VCI Device" filed on Nov. 8, 2013 with State Intellectual Property Office of the People's Republic of China, the content of which is incorporated in its entirety by reference herein.

FIELD OF THE INVENTION

The present invention is generally related to the field of automobile diagnostic technology. More particularly, it relates to an apparatus for automatic connection between an automobile diagnostic device and a VCI device, and to a method for the automatic connection.

BACKGROUND OF THE INVENTION

In recent years, rapid growth of hybrid and electronically controlled vehicles has caused the development of maintenance and service devices of automobile computer systems, resulting in various automobile computer programming and diagnostic devices. Accordingly, programming and diagnostic systems that implement a connection mode between a programming or diagnostic device and a vehicle communication interface (VCI) have been developed, where the programming or diagnostic device is the master and the automobile computers are slaves. The communication therebetween is made mainly through USB devices, while other modes like wired network, Bluetooth and wireless network are also used.

The communication between existing automobile programming and diagnostic devices and VCI devices is mostly in USB mode, while some other devices also support wired or wireless network connection mode. However, when connecting with USB connection, Bluetooth, wired network or wireless network, it often takes a considerable amount of effort to set up the connection mode. When entering the diagnostic or programming process, a user has to be prompted to select a communication mode and then set up and connect the device manually. This causes low efficiency, poor user experience and high maintenance cost due to repeated operations.

SUMMARY OF THE INVENTION

The present invention provides an apparatus for automatic connection between an automatic diagnostic device and a VCI device and a method for the automatic connection. The invention reduces or removes the need for manual operations for connecting the automobile diagnostic device and the VCI device.

In a preferred embodiment of the invention, an automatic connection method for establishing a connection between an automobile diagnostic device and a VCI device is disclosed. The method includes the steps of: (1) periodically connecting the VCI device in at least one of a plurality of connection modes in pre-stored connection records when the automobile diagnostic device is started; and (2) when successfully connecting the VCI device in a successful connection mode, communicating with the VCI device in the successful connection mode.

In another preferred embodiment, the plurality of connection modes includes USB, Bluetooth, infrared, NFC and WIFI.

In another preferred embodiment, the step of periodically connecting the VCI device with at least one of a plurality of connection modes in stored connection records further includes the steps of: (1) attempting to connect with a wired connection in the stored connection records; and (2) attempting to connect with a wireless connection in the stored connection records when the wired connection fails.

In another preferred embodiment, the automatic connection method further includes the step of: recording the successful connection mode as a current connection mode.

In another preferred embodiment, the automatic connection method further includes the step of: reconnecting the VCI device in the current connection mode when the automobile diagnostic device is restarted or the connection fails in a predefined period of time.

Yet in another preferred embodiment of the invention, an automatic connection device for establishing a connection between an automobile diagnostic device and a VCI device is disclosed. The automatic connection device includes: (1) a connection module, which is used for periodically connecting the VCI device in at least one of a plurality of connection modes in stored connection records when the automobile diagnostic device is started; and (2) a communication module, where, when successfully connecting the VCI device in a successful connection mode, the communication module is used for communicating with the VCI device in the successful connection mode.

In another preferred embodiment of the invention, the plurality of connection modes includes USB, Bluetooth, Infrared, NFC and WIFI.

In another preferred embodiment of the invention, the connection module further includes: (1) a wired connection means, which is used for attempting to connect with a wired connection in the stored connection records; and (2) a wireless connection means, which is used for attempting to connect with a wireless connection in the stored connection records when the wired connection fails.

In another preferred embodiment of the invention, the automatic connection device further includes a recording module, which is used for recording the present successful connection mode to be the current connection mode.

In another preferred embodiment of the invention, the automatic connection device further includes a reconnection module, which is used for reconnecting the VCI device with the current connection mode when the automobile diagnostic device is restarted or the connection fails within a predefined period of time.

By providing an automatic connection method and device between an automatic diagnostic device and a VCI device, the invention significantly improves the operation efficiency of the automobile diagnostic device, thus reducing manual labor costs and improving user experience.

DESCRIPTION OF THE INVENTION

Figure 1:
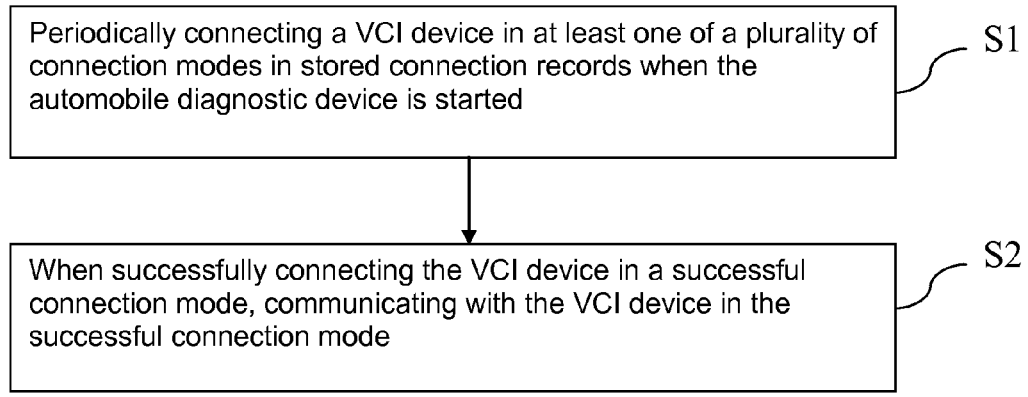
FIG. 1 is a schematic flow diagram illustrating an automatic connection method for establishing a connection between an automobile diagnostic device and a VCI device according to the invention.

While the present invention may be embodied in many different shapes, forms, sizes, colors, designs or configurations, for the purpose of promoting an understanding of the principles of the invention, reference will be made to the embodiments illustrated in the drawings and specific language will be used to describe the same. It will nevertheless be understood that no limitation of the scope of the invention is thereby intended. Any alterations and further implementations of the principle, the essence or the spirit of the invention as described herein are contemplated as would normally occur to one skilled in the art to which the invention relates.

The invention provides an automatic connection method and apparatus between an automatic diagnostic device and a VCI device. It reduces or removes the need for manual operations for connecting the automobile diagnostic device and the VCI device. To make clearer the objectives, solutions and advantages of this invention, this invention is further described in details below in combination with appended drawings and embodiments. It should be understood that the embodiments described in details herein are used only for explaining this invention but not for limiting this invention.

FIG. 1 is a schematic diagram illustrating an automatic connection method for establishing a connection between an automobile diagnostic device and a VCI device according to the invention. The automatic connection method for establishing a connection between an automobile diagnostic device and a VCI device includes the following steps:

S1. Periodically connecting the VCI device in at least one of a plurality of connection modes in the stored connection records when the automobile diagnostic device is started; and S2. When successfully connecting the VCI device in a successful connection mode, communicating with the VCI device in the successful connection mode.

The automatic diagnostic device can be a device or an instrument that has programming or diagnostic function.

In step S1, when the automatic diagnostic device is started, the automatic diagnostic device attempts to connect the VCI device according to connection records stored during past connections. The connection records can be the records of last connection of the automatic diagnostic device, or all connection records of the automobile diagnostic device within a period of time. The connection records can be sorted by a predefined criterion, such as duration or stability of connection. In this embodiment, wired connection mode is chosen as the preferred connection mode. The connection records contain the connection details of each connection mode. As an example, it contains information about DHCP or static IP mode of wired connection such as IP address, subnet mask and DNS. It also contains information about wireless connection such as HotAP and password.

The automobile diagnostic device periodically connects with the VCI device in a connection mode in the stored connection records. For example, a wired connection mode is in the first priority. The automobile diagnostic device first attempts to connect the VCI device in the wired connection mode such as USB. After the wired connection fails, it then attempts to connect the VCI device in a wireless mode such as Bluetooth, infrared, NFC or WIFI.

When the automobile diagnostic device successfully connects with the VCI device, it stores the successful connection mode as the current connection mode. When the connection is suddenly interrupted or the automobile diagnostic device is restarted within a predefined period of time, for example, one hour, the automobile diagnostic device prefers to reconnect the VCI device in the current connection mode.

Once the automobile diagnostic device successfully connects with the VCI device, the connection mode and status are displayed on its interface to users.

The most important advantage of this embodiment according to the invention is that by providing an automatic connection between the automobile diagnostic device and the VCI device, it increases the efficiency of the automobile diagnostic device, reduces labor costs and greatly improves user experience.

Figure 2:
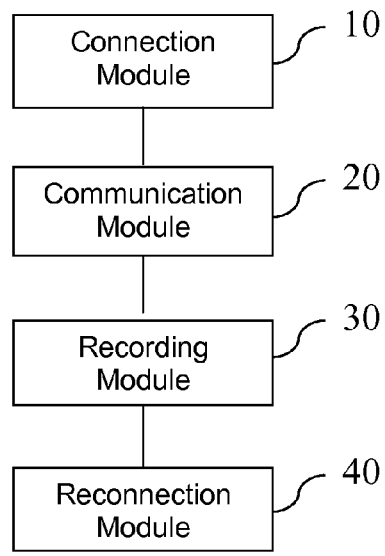
FIG. 2 is a schematic flow diagram illustrating an automatic connection device for establishing a connection between an automobile diagnostic device and a VCI device according to the invention.

FIG. 2 is a schematic diagram illustrating an automatic connection device for establishing a connection between an automobile diagnostic device and a VCI device according to the invention. The automatic connection device can the automobile diagnostic device it self, or it can be a built-in or external device of the automobile diagnostic device. The automatic connection device includes the followings:

a connection module 10, which is used for periodically connecting the VCI device in at least one of a plurality of connection modes in the stored connection records when the automobile diagnostic device is started;

a communication module 20, where, when successfully connecting the VCI device with a successful connection mode, the communication module is used for communicating with the VCI device with the successful connection mode;

a recording module 30, which is used for recording the present successful connection mode as the current connection mode; and a reconnection module 40, which is used for reconnecting the VCI device in the current connection mode when the automobile diagnostic device is restarted or the connection fails within a predefined period of time.

Figure 3:
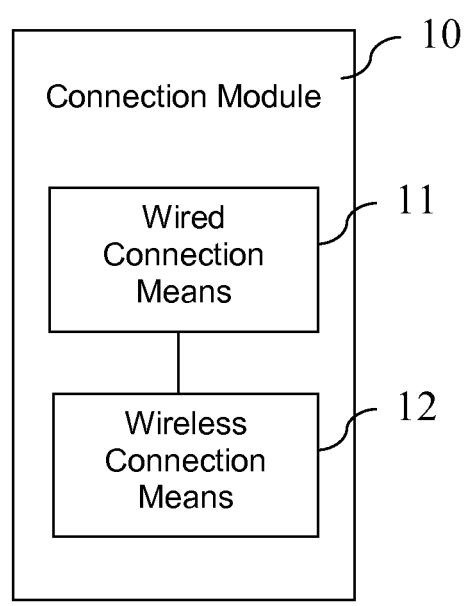
FIG. 3 is a schematic block diagram illustrating the connection module 10 in the automatic connection device of FIG. 2.

FIG. 3 is a schematic diagram illustrating the connection module 10 in the automatic connection device of FIG. 2. The connection module 10 includes:

a wired connection means 11, which is used for attempting the wired connection in stored connection records; and a wireless connection means 12, which is used for attempting the wireless connection modes in stored connection records when the wired connection fails.

When the automobile diagnostic device starts, it attempts to connect the VCI device in connection modes according to connection records saved during past connections using connection module 10. The connection records can be the records of last connection of the automobile diagnostic device, or all connection records of the automobile diagnostic device within a period of time. The connection records can be sorted by a predefined criterion, such as duration or stability of connection. In this embodiment, wired connection mode is chosen as the preferred connection mode. The connection records contain the connection details of each connection mode. For example, it contains information about DHCP or static IP mode of a wired connection such as IP address, subnet mask and DNS. It also contains information about wireless connection such as hotspot name and password.

The automobile diagnostic device periodically connects with the VCI device in a connection mode in the stored connection records using connection module 10. For example, a wired connection is in the first priority. The automatic diagnostic device first attempts to connect with the VCI device in a wired connection mode such as a USB using wired connection means 11. When the wired connection fails, it attempts to connect with the VCI device in a wireless mode such as Bluetooth, infrared, NFC or WIFI using the wireless connection means 12.

When the automobile diagnostic device successfully connects with the VCI device, it stores the successful connection mode as the current connection mode using the recording module 30. When the connection is suddenly interrupted or the automobile diagnostic device is restarted within a predefined period of time, for example, one hour, the automobile diagnostic device then prefers to reconnect the VCI device in current connection mode using reconnection module 40.

Once the automobile diagnostic device successfully connects with the VCI device, the connection mode and status are displayed on its interface to users.

This embodiment of the invention, by providing automatic connection between the automobile diagnostic device and the VCI device, increases the efficiency of the automobile diagnostic device, reduces labor costs and greatly improves user experience.

While one or more embodiments of the present invention have been illustrated above, the skilled artisan will appreciate that modifications and adoptions to those embodiments may be made without departing from the scope and spirit of the present invention.

The invention claimed is:

1. An automatic connection method for establishing a connection between an automobile diagnostic device and a VCI device, said method comprising the steps of:
   periodically connecting said VCI device in at least one of a plurality of connection modes in stored connection records when said automobile diagnostic device is started; and
   after said automobile diagnostic device being successfully connected with said VCI device, communicating with said VCI device in a mode of said successful connection.

2. The method of claim 1, wherein said plurality of connection modes comprises of USB, Bluetooth, infrared, NFC and WIFI.

3. The method of claim 1, said step of regularly connecting said VCI device with at least one of a plurality of connection modes in stored connection records further comprising the steps of:
   attempting to connect with a wired connection in said stored connection records; and
   attempting to connect with a wireless connection in said stored connection records when said wired connection fails.

4. The method of claim 1, further comprising the step of:
   recording said successful connection mode as a current connection mode.

5. The method of claim 4, further comprising the step of:
   reconnecting said VCI device in said current connection mode when said automobile diagnostic device is restarted or said connection fails in a predefined period of time.

6. An automatic connection device for establish a connection between an automobile diagnostic device and a VCI device, said automatic connection device comprising:
   a connection module, wherein said connection module periodically connects with said VCI device in at least one of a plurality of connection modes in stored connection records when said automobile diagnostic device is started; and
   a communication module, wherein, when said automobile diagnostic device is successfully connected with said VCI device, said communication module communicates with said VCI device in a mode of said successful connection.

7. The automatic connection device of claim 6, wherein said plurality of connection modes comprises of USB, Bluetooth, Infrared, NFC and WIFI.

8. The automatic connection device of claim 6, said connection module further comprising:
   a wired connection means, said wired connection means is used for attempting to connect with a wired connection in said stored connection records; and
   a wireless connection means, wherein said wireless connection means is used for attempting to connect with a wireless connection in said stored connection records when said wired connection fails.

9. The automatic connection device of claim 6, further comprising:
   a recording module, said recording module is used for recording present successful connection mode to be a current connection mode.

10. The automatic connection device of claim 9, further comprising:
    a reconnection module, wherein, said reconnection module is used for reconnecting said VCI device with said current connection mode when said automobile diagnostic device is restarted or said connection fails within a predefined period of time.

* * * * *